United States Patent
Hida et al.

(10) Patent No.: US 8,944,496 B2
(45) Date of Patent: Feb. 3, 2015

(54) VEHICLE ROOF STRUCTURE

(75) Inventors: Kazunori Hida, Wako (JP); Hitoshi Mizohata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/343,886

(22) PCT Filed: Sep. 12, 2011

(86) PCT No.: PCT/JP2011/070692
§ 371 (c)(1),
(2), (4) Date: Mar. 10, 2014

(87) PCT Pub. No.: WO2013/038466
PCT Pub. Date: Mar. 21, 2013

(65) Prior Publication Data
US 2014/0217783 A1    Aug. 7, 2014

(51) Int. Cl.
*B62D 25/06* (2006.01)
*B62D 27/02* (2006.01)

(52) U.S. Cl.
CPC .............. *B62D 27/026* (2013.01); *B62D 25/06* (2013.01); *B62D 27/02* (2013.01)
USPC ........................................................ 296/210

(58) Field of Classification Search
CPC ....................................................... B62D 25/06
USPC ................... 296/210, 193.05, 193.12, 203.03
See application file for complete search history.

(56) References Cited

U.S. PATENT DOCUMENTS

| | | | |
|---|---|---|---|
| 6,027,160 A | 2/2000 | Brodt et al. | |
| 7,810,871 B2 * | 10/2010 | Matsui | 296/187.12 |
| 8,123,286 B2 * | 2/2012 | Furusako et al. | 296/203.03 |
| 8,210,602 B2 * | 7/2012 | Kobayashi et al. | 296/203.03 |
| 8,740,290 B2 * | 6/2014 | Takayama et al. | 296/193.05 |
| 2004/0046423 A1 * | 3/2004 | Wieber | 296/203.03 |
| 2008/0277973 A1 * | 11/2008 | Mourou | 296/210 |
| 2011/0121614 A1 * | 5/2011 | Kobayashi et al. | 296/210 |

(Continued)

FOREIGN PATENT DOCUMENTS

| | | |
|---|---|---|
| JP | 61-502324 | 10/1986 |
| JP | 1-201495 | 8/1989 |

(Continued)

OTHER PUBLICATIONS

Japanese Office action for JP 2010-066771, Partial English translation included.

*Primary Examiner* — H Gutman
(74) *Attorney, Agent, or Firm* — Rankin, Hill & Clark LLP (57) ABSTRACT

Left and right roof rails for supporting a roof panel include left and right inner rails; and left and right outer panels located on the outsides of the left and right inner rails in the width direction of the vehicle. Each of the outer panels is formed in a stepped shape and includes a stepped section at an intermediate stage and an upper outer flange at a lower stage. The upper outer flanges are joined to the upper surfaces of the associated inner rail. The left and right ends of the roof panel are joined to the stepped surfaces of the stepped sections by adhesion sections and temporarily securing sections. The temporarily securing sections are weld portions that provide temporary affixation until the adhesion sections can exhibit an adhesion force, and the temporarily securing sections are covered with filling agent layers that are filled into the stepped sections.

3 Claims, 7 Drawing Sheets

(56) References Cited

U.S. PATENT DOCUMENTS

| | | | |
|---|---|---|---|
| 2011/0233970 A1* | 9/2011 | Nagai et al. | 296/203.03 |
| 2014/0138988 A1* | 5/2014 | Kisaku et al. | 296/210 |

FOREIGN PATENT DOCUMENTS

| | | |
|---|---|---|
| JP | 06-239266 | 8/1994 |
| JP | 11-180339 | 7/1999 |
| JP | 2003-341547 | 12/2003 |
| JP | 2004-306676 | 11/2004 |
| JP | 2009-202828 | 9/2009 |
| JP | 2011-195105 | 10/2011 |
| JP | 2011-195106 | 10/2011 |
| WO | 85/05604 | 12/1985 |

* cited by examiner

VEHICLE ROOF STRUCTURE

TECHNICAL FIELD

The present invention relates to a vehicle roof structure including left and right roof rails extending in a longitudinal direction of a vehicle body for supporting a roof panel.

BACKGROUND ART

A roof constituting an upper part of a vehicle body includes left and right roof rails and a roof panel supported at left and right ends thereof by the left and right roof rails. The left and right roof rails and the left and right ends of the roof panel are vertically overlapped on each other, respectively, and joined together by spot welding. Upwardly opened grooves are formed at joint portions where the left and right roof rails and the left and right ends of the roof panel are joined together, which allow spot welding operation to be performed thereon in the vertical direction. The grooves are covered by decorative moldings, so that welding traces formed by spot welding on bottoms of the grooves are concealed by the decorative moldings, whereby an external appearance of the vehicle is improved. However, from a viewpoint of reducing the number of required parts in the vehicle body, it is preferable that such decorative moldings be eliminated.

A vehicle roof without such decorative moldings is disclosed, for example, in Patent Literature 1. The vehicle roof of Patent Literature 1 includes a frame-like inner roof member provided between a roof panel and left and right roof rails. The inner roof member has stepped sections on left and right ends thereof formed in a stepped shape to be lowered outward by one step. The stepped sections are overlapped on the left and right roof rails and joined thereto by spot welding. Upwardly opened grooves are formed at joint portions where the left and right ends of the inner roof member and the left and right roof rails are joined together. Bottoms of the grooves are formed by lowest surfaces of the stepped sections. The roof panel is mounted over the inner roof member so as to cover most parts of the grooves.

However, although the most parts of the grooves are covered by the roof panel, the residual parts of the grooves that are not covered are conspicuous as unnecessary gaps. Thus, there is room for further improvement for enhancing the external appearance of the vehicle. Further, amounts of the gaps formed between left and right ends of the roof panel and the left and right roof rails have to be adequately controlled.

PRIOR ART LITERATURE

Patent Literature

Patent Literature 1: U.S. Pat. No. 6,027,160

SUMMARY OF INVENTION

Technical Problems

It is therefore an object of the present invention to provide a vehicle roof structure which is capable of enhancing the external appearance of a vehicle without providing decorative moldings on joint portions of left and right roof rails and left and right ends of a roof panel.

Solutions to Problems

According to the invention, there is provided a vehicle roof structure comprising a roof panel, and left and right roof rails extending in a longitudinal direction of a vehicle body for supporting the roof panel, wherein the left and right roof rails include left and right inner rails having a closed cross section and extending in the longitudinal direction of the vehicle body to constitute part of a vehicle body frame, and left and right outer panels located outward of the left and right inner rails in a vehicle width direction, wherein the left and right outer panels include left and right stepped sections each extending from an upper edge of a corresponding one of the left and right outer panels downward and then inward in the vehicle width direction to form a step, and left and right upper flanges each extending from a corresponding one of the left and right stepped sections downward and then inward in the vehicle width direction to form a step, wherein the left and right upper flanges of the left and right outer panels are overlapped respectively on upper surfaces of the left and right inner rails and joined thereto, wherein the roof panel has left and right ends formed so as to extend downwardly toward stepped surfaces of the left and right stepped sections and overlapped on the left and right stepped surfaces, whereby left and right grooves opened upward are formed by the left and right stepped sections and the left and right ends, wherein the left and right ends of the roof panel are joined to the left and right stepped surfaces via adhesion sections using adhesive agent and temporarily securing sections which provide temporary affixation by welding until the adhesion sections can exhibit an adhesion force, and wherein the temporarily securing sections are covered with filling agent layers which are formed by a filling agent filled into the left and right stepped sections.

Preferably, the temporarily securing sections are welded by pulse laser welding.

Preferably, the adhesion sections are located, at the left and right ends of the roof panel, inward of the temporarily securing sections in the vehicle width direction.

Preferably, widths of the filling agent layers range in the left and right stepped sections, respectively, from left and right corners formed between the upper edges of the left and right outer panels and the left and right stepped surfaces to regions covering the temporarily securing sections.

Preferably, surfaces of the filling agent layers filled into the left and right stepped sections have a substantially curved shape gradually curved downward from nearby the upper edges of the left and right outer panels to the regions covering the temporarily securing sections.

Preferably, the vehicle roof structure further comprises a roof supporting skeleton body mounted on and between the left and right roof rails to support the roof panel, the roof supporting skeleton body and the roof panel together forming a roof panel assembly, wherein the roof supporting skeleton body includes: a front end lateral arch extending in the vehicle width direction along a front end of the roof panel; a middle lateral arch extending in the vehicle width direction along a longitudinal middle section of the roof panel; a rear end lateral arch extending in the vehicle width direction along a rear end of the roof panel; and at least one longitudinal arch positioned at a substantial center in the vehicle width direction of the roof panel and extending in the longitudinal direction of the vehicle body to connect the front end lateral arch, the middle lateral arch, and the rear end lateral arch together, wherein the front end of the roof panel is joined to the front end lateral arch, and the rear end of the roof panel is joined to the rear end lateral arch, and wherein the roof panel assembly is joined to the left and right roof rails via the left and right ends of the roof panel as well as opposite ends of the front end lateral arch and opposite ends of the rear end lateral arch.

Preferably, the vehicle roof structure further comprises a roof supporting skeleton body mounted on and between the left and right roof rails to support the roof panel, the roof supporting skeleton body and the roof panel together forming a roof panel assembly, wherein the roof supporting skeleton body includes: a front end lateral arch extending in the vehicle width direction along a front end of the roof panel; a middle lateral arch extending in the vehicle width direction along a longitudinal middle section of the roof panel; a rear end lateral arch extending in the vehicle width direction along a rear end of the roof panel; and left and right longitudinal arches positioned at a substantial center in the vehicle width direction of the roof panel and extending in the longitudinal direction of the vehicle body to connect the front end lateral arch, the middle lateral arch, and the rear end lateral arch together, wherein the left and right longitudinal arches are spaced apart from each other in the vehicle width direction, wherein the front end of the roof panel is joined to the front end lateral arch, and the rear end of the roof panel is joined to the rear end lateral arch, and wherein the roof panel assembly is joined to the left and right roof rails via the left and right ends of the roof panel as well as opposite ends of the front end lateral arch and opposite ends of the rear end lateral arch.

Advantageous Effects of Invention

In the invention, each of the left and right outer panels located outward of the left and right inner rails in the vehicle width direction is partly formed in a stepped shape extending from the upper edge thereof downward and inward in the vehicle width direction to have an intermediate stage and a lower stage, and has the upper flange constituting the lower stage joined to the corresponding one of the upper surfaces of the left and right inner rails. The roof panel has the left and right ends each formed so as to extend downwardly toward the stepped surface of the stepped section constituting the intermediate stage to be joined to the stepped surface via the adhesion section and the temporarily securing section. The left and right grooves opened upward are formed, respectively, by the left and right stepped sections and the left and right ends of the roof panel.

The temporarily securing sections are weld portions which provide temporary affixation until the adhesion sections can exhibit a predetermined adhesion force, and thus welding strength may be small. That is, the left and right ends of the roof panel are joined to the stepped surfaces mainly via the adhesion section. After the adhesion sections have exhibited the predetermined adhesion force, the temporarily securing sections finish their role of providing temporary affixation, and are necessary only to compensate the bonding effect by the adhesion sections. Therefore, welding traces of the temporarily securing sections formed on bottoms of the left and right grooves can be small and inconspicuous. Further, the temporarily securing sections are covered with the filling agent layers which are formed by the filling agent filled into the left and right stepped sections, and thus not visible from the outside.

The left and right ends of the roof panel are each formed so as to extend downwardly toward the stepped surface of the stepped section constituting the lower stage and joined thereto, whereby the left and right grooves are formed. Since the left and right grooves are shallow, a satisfactory external appearance can be ensured. Therefore, there is no need to cover the left and right grooves by decorative moldings. Further, joint portions of the left and right upper flanges of the left and right outer panels and the upper surfaces of the left and right inner rails are covered by the roof panel, and thus not visible from the outside.

In this manner, it is possible to enhance the external appearance of the vehicle without providing the decorative moldings on joint portions of the left and right roof rails and the left and right ends of the roof panel.

In the invention, since the temporarily securing sections are welded by pulse laser welding, the welding traces (hit traces or dents) formed by welding on the left and right ends of the roof panel are small. Thus, the welding traces can easily be covered by the filling agent layers. Further, by pulse laser welding, areas of weld portions (the temporarily securing sections) can be small, and the weld portions can be located at the left and right ends of the roof panel close to the edges thereof.

In the invention, the adhesion sections are located, at the left and right ends of the roof panel, inward of the temporarily securing sections in the vehicle width direction. Therefore, the adhesion sections for the left and right ends of the roof panel can be formed continuously in a longitudinal direction of the grooves without overlapping with the temporarily securing sections. As a result, adhesion areas between the left and right ends of the roof panel and the left and right stepped sections can be wide, and thus adhesion strength therebetween can be increased.

In the invention, the widths of the filling agent layers range, respectively, from the left and right corners formed between the upper edges of the left and right outer panels and the left and right stepped surfaces to the regions covering the temporarily securing sections. By covering the left and right corners and the temporarily securing sections with the filling agent layers, it is possible to further enhance the external appearance of the vehicle.

In the invention, the surfaces of the filling agent layers have a substantially curved shape gradually curved downward from nearby the upper edges of the left and right outer panels to the regions covering the temporarily securing sections. By covering the left and right corners and peripheries thereof with the filling agent layers each having the substantially curved-shaped surface, contours of the left and right grooves are made inconspicuous, and thus it is possible to further enhance the external appearance of the vehicle.

In the invention, the roof panel assembly is formed of the roof panel and the roof supporting skeleton body for supporting the roof panel. The roof panel assembly is built into the vehicle body with the roof supporting skeleton body being mounted on and between the left and right roof rails. More specifically, the roof panel assembly is joined to the left and right roof rails via the left and right ends of the roof panel as well as the opposite ends of the front end lateral arch and the opposite ends of the rear end lateral arch, whereby the roof panel assembly is built into the vehicle body. In other words, the number of joint portions for joining the roof panel assembly to the left and right roof rails can be small. As a result, the man-hours required for assembling the vehicle body can be reduced and the assembly operation of the vehicle body can be facilitated.

Further, the roof supporting skeleton body is composed of the front end lateral arch, middle lateral arch, and rear end lateral arch extending in the vehicle width direction, and the at least one longitudinal arch extending in the longitudinal direction of the vehicle body. In the structure where the roof panel assembly is mounted on and between the left and right roof rails, a frame having a substantially rectangular shape in plan view is formed by the left and right roof rails and the front and rear end lateral arches. By providing the middle lateral arch and the at least one longitudinal arch so as to divide the inside of the substantially rectangular frame into a plurality of spaces, strength and rigidity of the roof panel can be increased.

In the invention, the roof panel assembly is formed of the roof panel and the roof supporting skeleton body for supporting the roof panel. The roof panel assembly is built into the vehicle body with the roof supporting skeleton body being mounted on and between the left and right roof rails. More specifically, the roof panel assembly is joined to the left and right roof rails via the left and right ends of the roof panel as well as the opposite ends of the front end lateral arch and the opposite ends of the rear end lateral arch, whereby the roof panel assembly is built into the vehicle body. In other words, the number of joint portions for joining the roof panel assembly to the left and right roof rails can be small. As a result, the man-hours required for assembling the vehicle body can be reduced and the assembly operation of the vehicle body can be facilitated.

Further, the roof supporting skeleton body is composed of the front end lateral arch, middle lateral arch, and rear end lateral arch extending in the vehicle width direction, and the left and right longitudinal arches extending in the longitudinal direction of the vehicle body. In the structure where the roof panel assembly is mounted on and between the left and right roof rails, a frame having a substantially rectangular shape in plan view is formed by the left and right roof rails and the front and rear end lateral arches. By providing the middle lateral arch and the left and right longitudinal arches so as to divide the inside of the substantially rectangular frame into six spaces, strength and rigidity of the roof panel can be increased. As a result, the required thickness of the roof panel can be reduced, and thus the weight of the vehicle body can be reduced.

DESCRIPTION OF EMBODIMENTS

A certain preferred embodiment of the present invention will be described in detail below with reference to the accompanying drawings.

Embodiment

Figure 1:
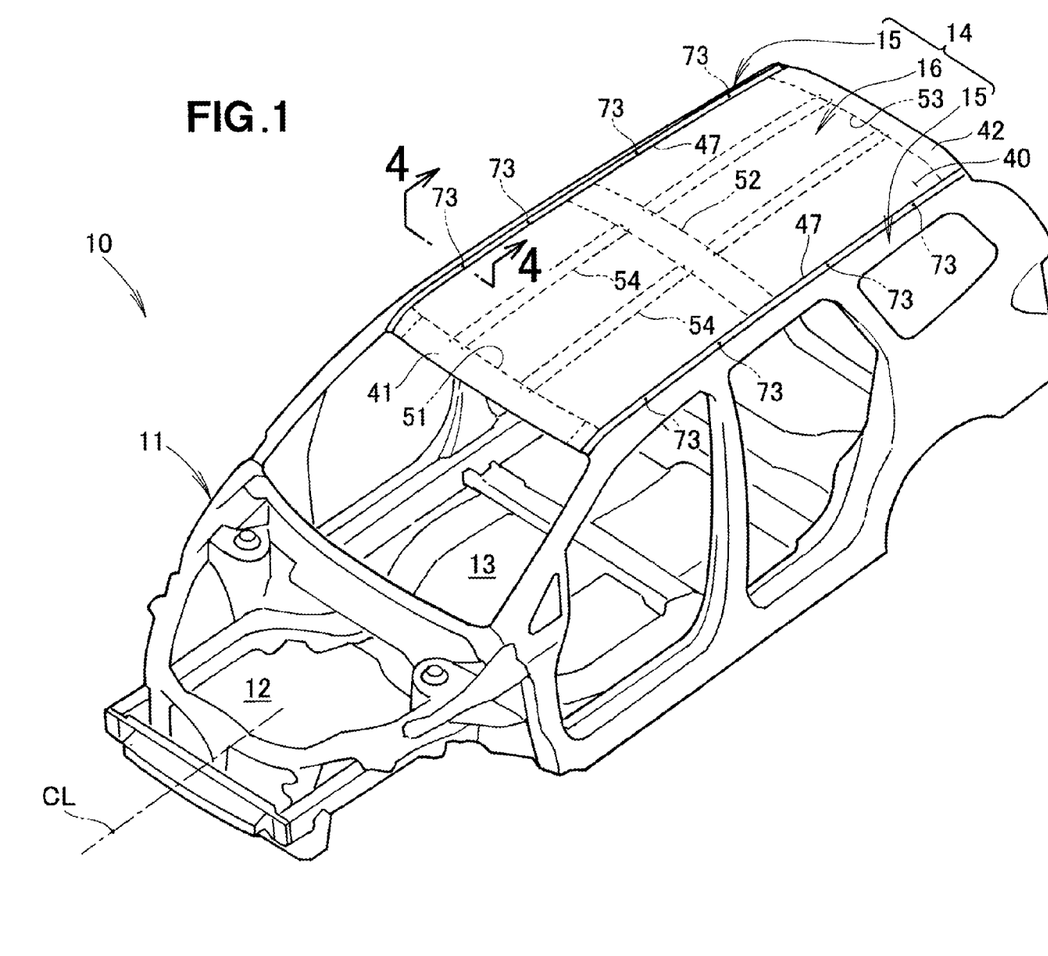
FIG. 1 is a perspective view of a vehicle body employing a vehicle roof structure according to the present invention.

As shown in FIG. 1, a vehicle 10 is a passenger vehicle, for example, which includes a vehicle body 11, an engine room 12 formed in the vehicle body 11 at a front part thereof, a cabin 13 positioned right behind the engine room 12. The vehicle body 11, which is a monocoque body, is formed in a laterally symmetrical shape with respect to a centerline CL extending in a longitudinal direction of the vehicle 10 through a center in a width direction of the vehicle 10.

A vehicle roof structure (hereinbelow, also referred to simply as "roof") 14 of the vehicle body 11 is formed as a part covering a top of the cabin 13, and includes left and right roof rails 15, 15 extending in a longitudinal direction of the vehicle body 11, and a roof panel assembly 16 supported by the left and right roof rails 15, 15.

Figure 2:
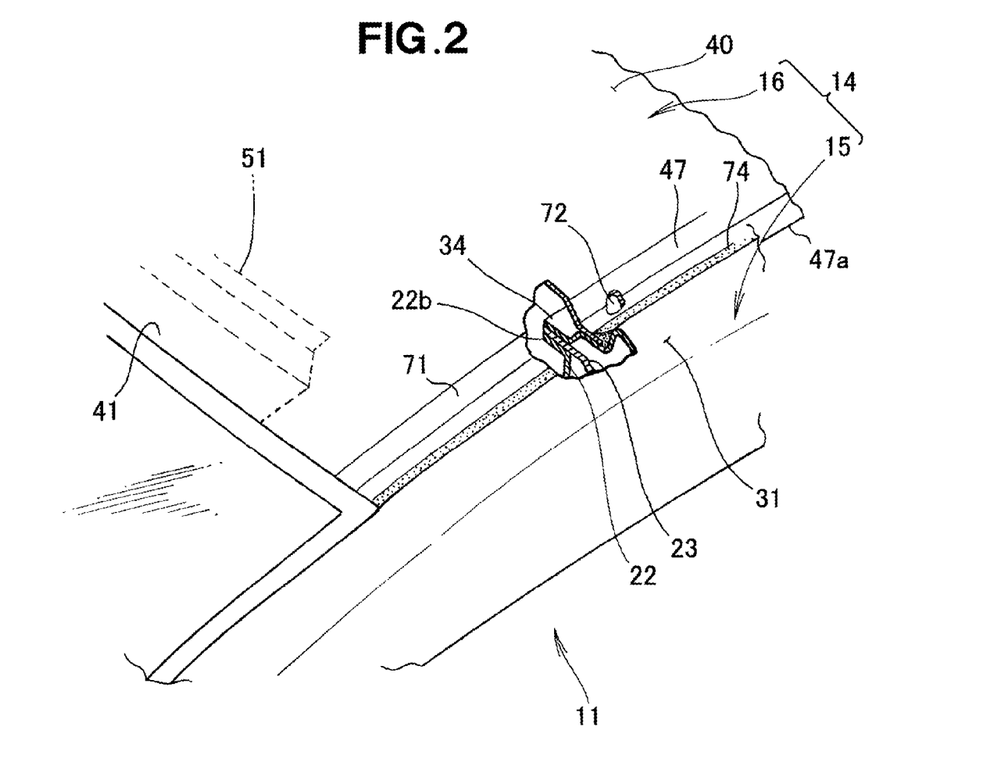
FIG. 2 is a perspective view with parts broken away of a left roof rail shown in FIG. 1 and its peripheral parts.
Figure 3:
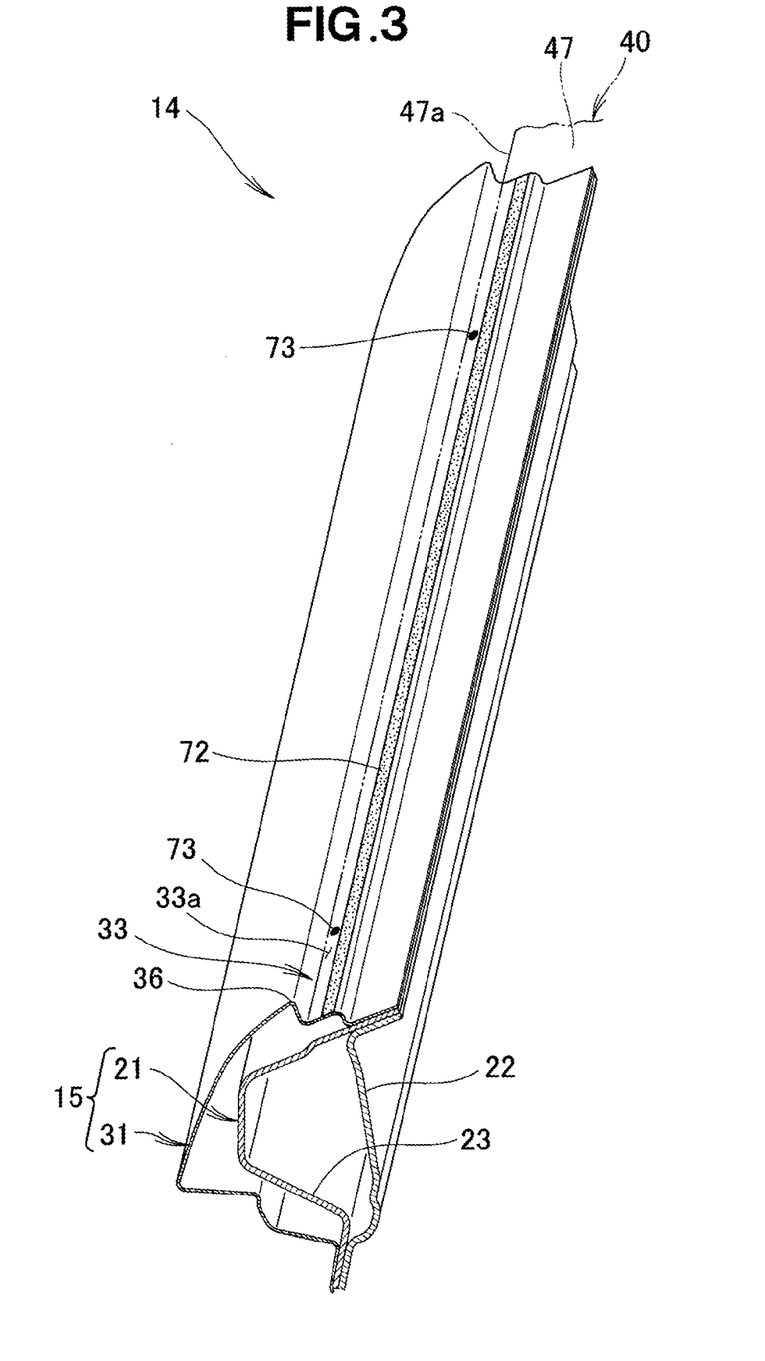
FIG. 3 is a perspective view of a right roof rail shown in FIG. 1.

As shown in FIGS. 1, 2, and 3, the left and right roof rails 15, 15 include left and right inner rails 21, 21 located inward in the vehicle width direction (on the cabin 13 sides), and left and right outer panels 31, 31 located outward in the vehicle width direction (on the outsides) of the left and right inner rails 21, 21. Hereinbelow, the right roof rail 15 will be described in detail. The left roof rail 15 is bilaterally symmetrical with the right roof rail 15 and has substantially the same shape, and a detail description thereof will be omitted.

Figure 4:
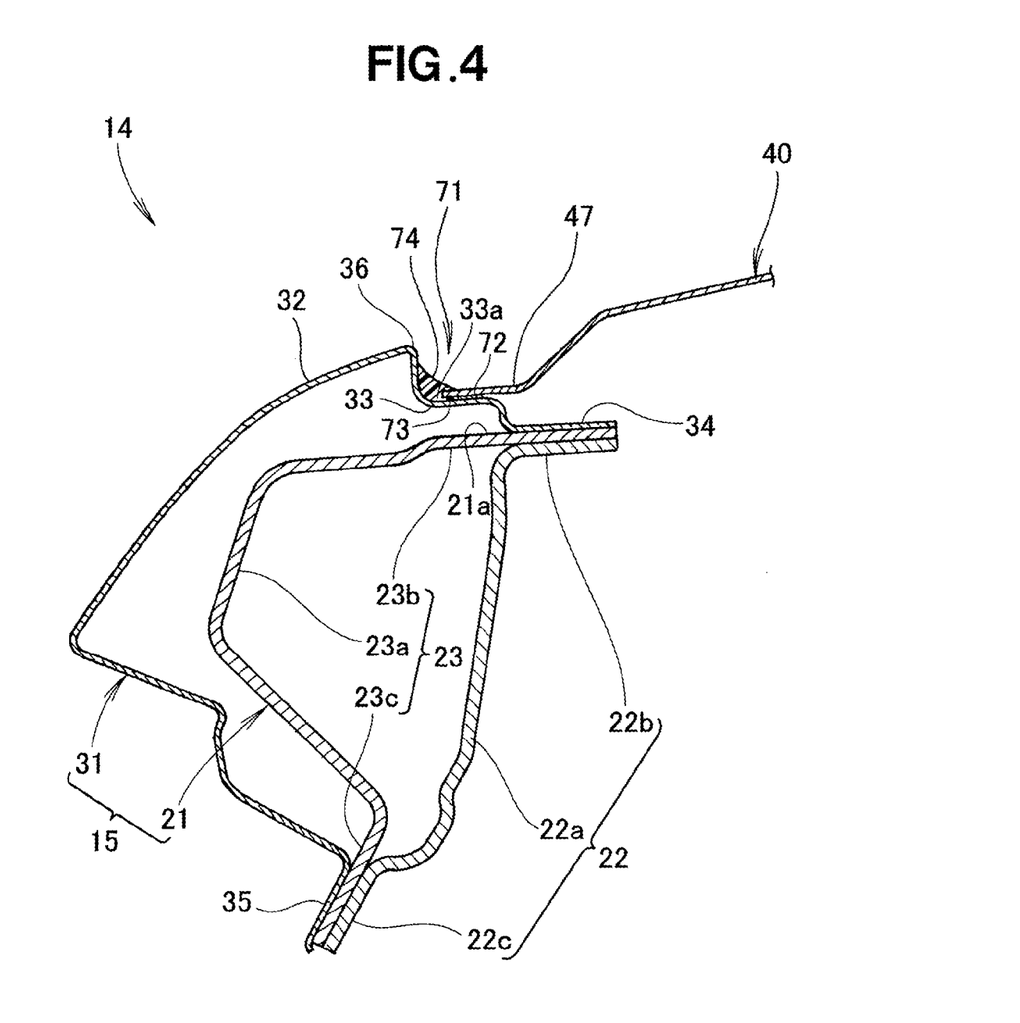
FIG. 4 is a cross-sectional view taken along line 4-4 of FIG. 1.
Figure 5:
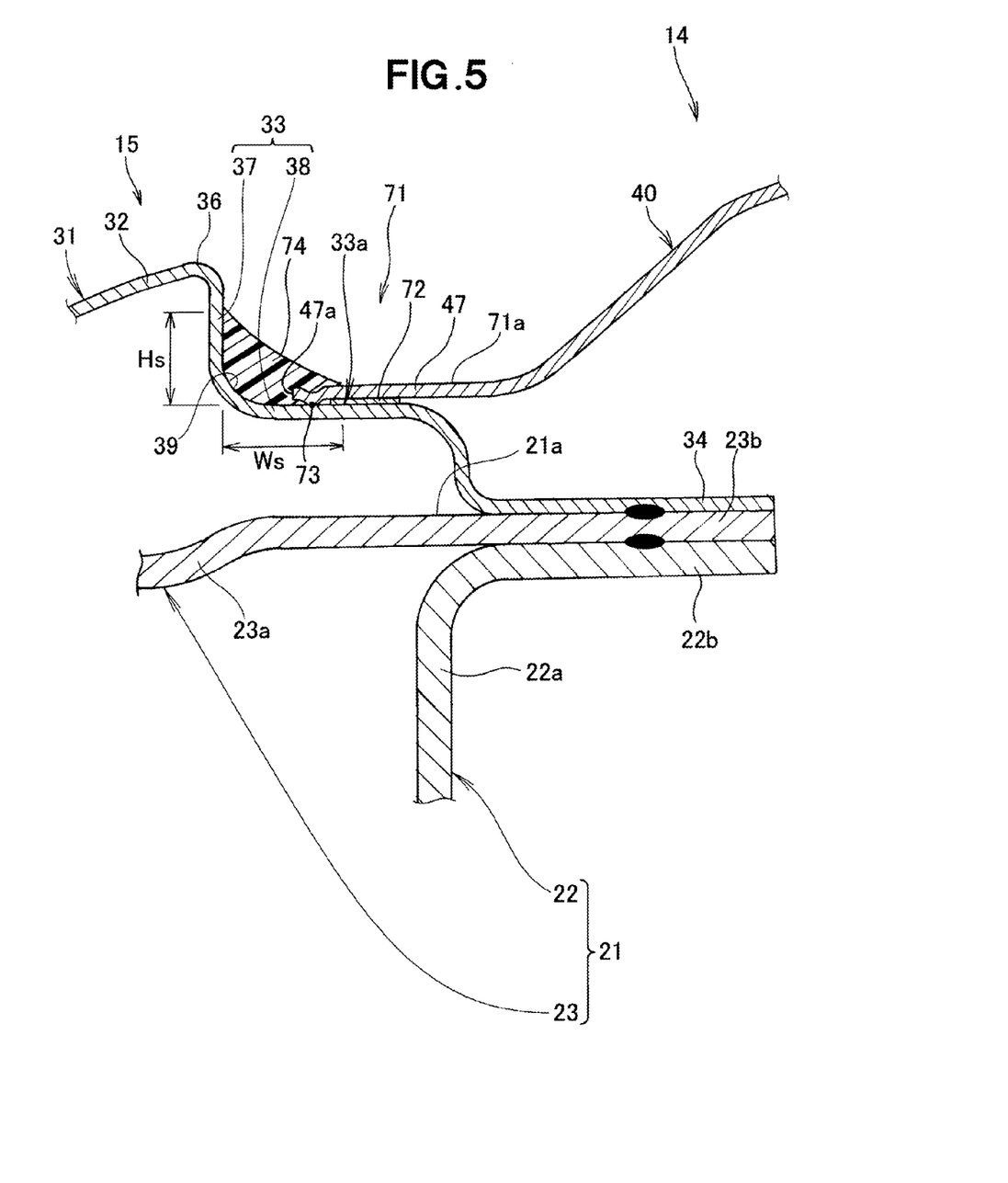
FIG. 5 is an enlarged cross-sectional view of a stepped section shown in FIG. 4 and its peripheral parts.

As shown in FIGS. 3, 4, and 5, the right inner rail 21 is a member having a closed cross section and extending in the longitudinal direction of the vehicle body to constitute a part of a frame of the vehicle body 11. The right inner rail 21 is formed by a right inner member 22 located inward in the vehicle width direction (on the cabin 13 sides shown in FIG. 1), and a right outer member 23 located outward of the right inner member 22 in the vehicle width direction.

The right inner member 22 is formed by press molding a steel sheet, and has a body 22a formed in a substantially vertical sheet shape, an upper flange 22b extending horizontally inward in the vehicle width direction from an upper end of the body 22a, and a lower flange 22c extending outward in the vehicle width direction and downward from an lower end of the body 22a.

The right outer member 23 is formed by press molding a steel sheet, and has a body 23a formed in a substantially U-shaped cross section opened toward the body 22a of the right inner member 22, an upper flange 23b extending horizontally inward in the vehicle width direction from an upper end of the body 23a, and a lower flange 23c extending outward in the vehicle width direction and downward from an lower end of the body 23a.

The upper flange 23b of the right outer member 23 is overlapped on the upper flange 22b of the right inner member 22 and joined thereto by welding, such as spot welding. The lower flange 23c of the right outer member 23 is overlapped on the lower flange 22c of the right inner member 22 and joined thereto by welding, such as spot welding. The right inner member 22 and the right outer member 23 are integrated in this manner to thereby form the right inner rail 21 having a closed cross section. Note that the right inner rail 21 may be formed in any other suitable manner to have a closed cross section, for example, it may be formed by a single pipe. The pipe is formed by extrusion molding, for example.

The right outer panel 31 is a member constituting an outer surface of the right roof rail 15, and formed of a sheet metal thinner than the right inner rail 21. More specifically, the right outer panel 31 is formed by press molding a steel sheet, such as aluminum-plated steel sheet, and mounted to cover the right inner rail 21 from outside thereof in the vehicle width direction with a predetermined space therebetween. The right outer panel 31 is formed in a substantially U-shaped cross section opened toward the right inner rail 21, and has a body 32, a stepped section 33, an upper flange 34, and a lower flange 35.

The outer-panel body 32 is formed in a curved shape bulged outward in the vehicle width direction to cover the entire outer member 23, and has an upper edge 36 located above the outer member 23. The stepped section 33 is formed in a substantially L-shaped cross section extending from the upper edge 36 of the outer-panel body 32 downward and then inward in the vehicle width direction. In other words, the stepped section 33 has a vertical wall 37 extending downward from the upper edge 36 of the outer-panel body 32, and a horizontal wall 38 extending from a lower end of the vertical wall 37 horizontally inward in the vehicle width direction. An upper surface of the horizontal wall 38 is referred to herein as "stepped surface 33a" of the stepped section 33. The outer-panel upper flange 34 is formed in a substantially L-shaped cross section extending from an inner end of the stepped section 33 downward and then inward in the vehicle width direction. The outer-panel lower flange 35 is formed to extend from a lower end of the outer-panel body 32 downward and outward in the vehicle width direction.

Note that the upper edge 36 of the outer-panel body 32 constitutes a top edge of the outer panel 31, and therefore the upper edge 36 of the outer-panel body 32 will be also referred to hereinbelow as "the upper edge 36 of the outer panel 31".

The outer-panel upper flange 34 is overlapped on an upper surface 21a of the inner rail 21 and joined thereto. More specifically, the outer-panel upper flange 34 is overlapped on the upper flange 23b of the outer member 23 and joined thereto together with the upper flange 22b of the inner member 22 by welding such as spot welding. The outer-panel lower flange 35 is overlapped on the lower flange 23c of the outer member 23 and joined thereto together with the lower flange 22c of the inner member 22 by welding such as spot welding. In this manner, the right roof rail 15 having a closed cross section is formed with the right outer-panel upper flange 34 being integrated with the right inner rail 21. The outer member 23, which is provided between the inner member 22 and the outer panel 31, can serve as a reinforcing member for the roof rail 15.

Figure 6:
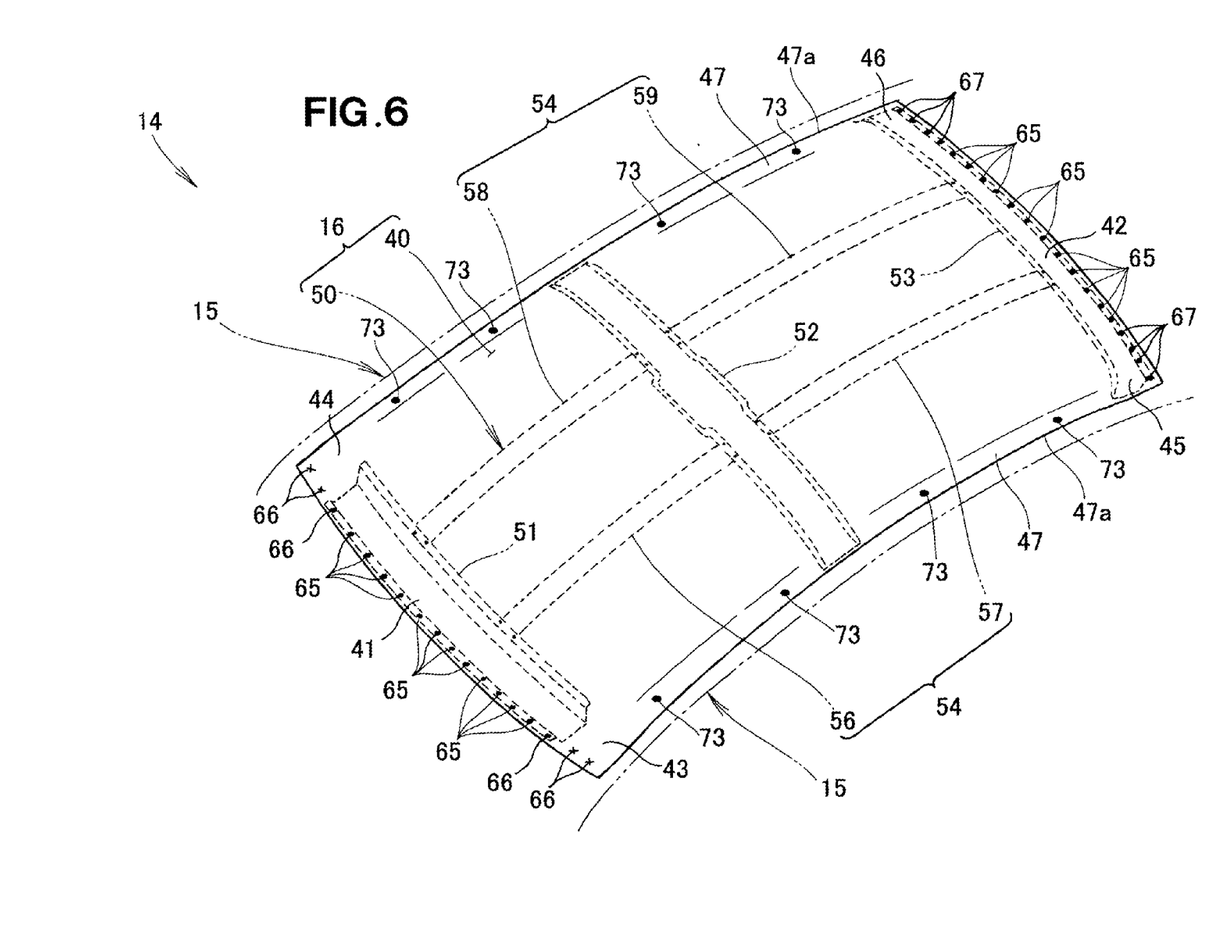
FIG. 6 is a perspective view of a roof panel assembly shown in FIG. 1.

As shown in FIGS. 1 and 6, the roof panel assembly 16 is formed by a roof panel 40, and a roof supporting skeleton body 50 mounted on and between the left and right roof rails 15, 15 to support the roof panel 40. The roof panel 40 is thus supported by the left and right roof rails 15, 15. The roof panel 40 is formed by press molding a steel sheet in a substantially rectangular shape elongated in the longitudinal direction of the vehicle body.

Figure 7:
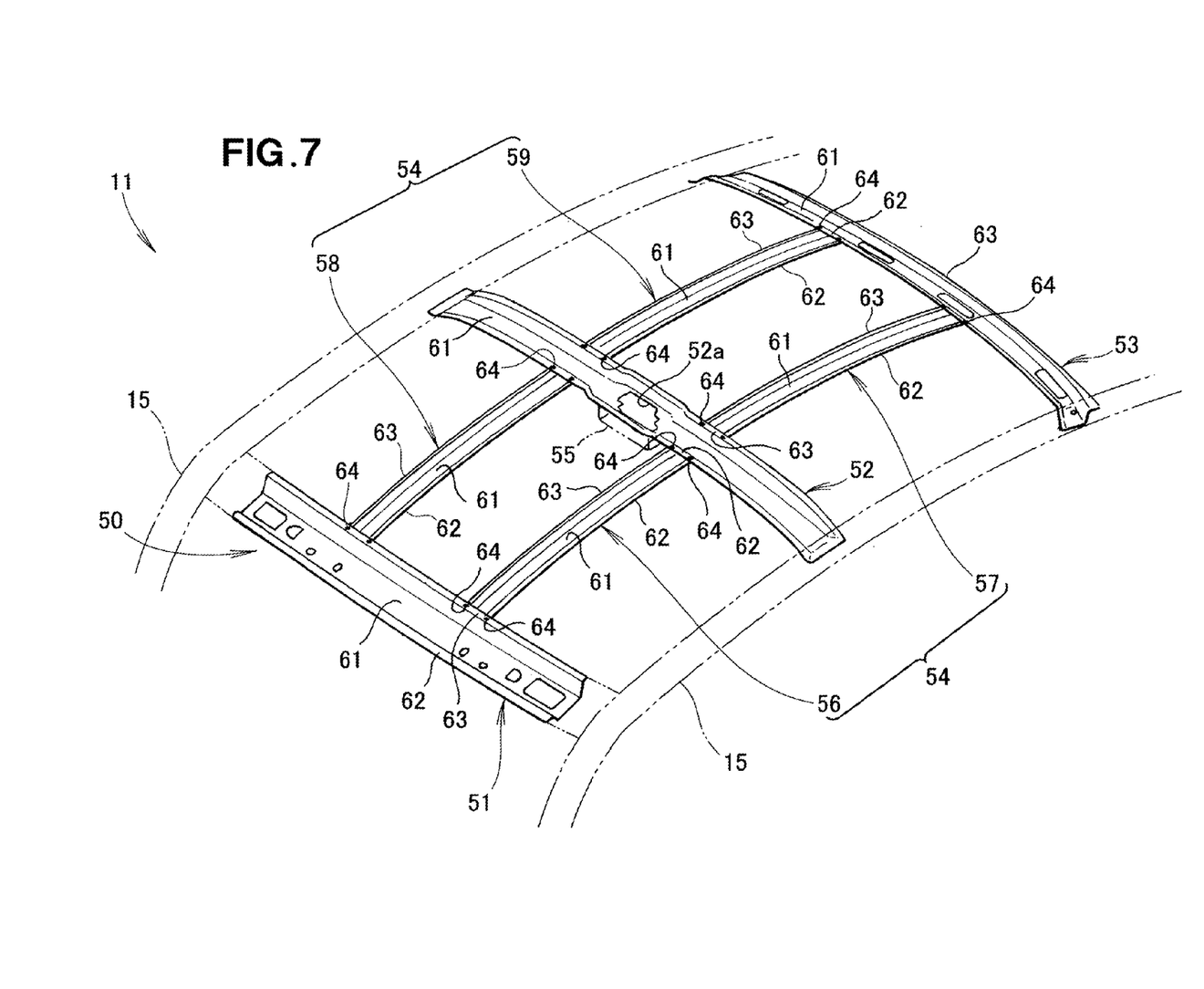
FIG. 7 is a perspective view of a roof supporting skeleton body shown in FIG. 6.

As shown in FIGS. 6 and 7, the roof supporting skeleton body 50 includes a front end lateral arch 51 extending in the vehicle width direction along a front end 41 of the roof panel 40, a middle lateral arch 52 extending in the vehicle width direction along a longitudinal middle section of the roof panel 40, a rear end lateral arch 53 extending in the vehicle width direction along a rear end 42 of the roof panel 40, and at least one longitudinal arch 54 (for example, two of left and right longitudinal arches 54, 54) positioned at a substantial center in the vehicle width direction of the roof panel 40 and extending in the longitudinal direction of the vehicle body.

The middle lateral arch 52 has a lamp opening 52a formed therein at the substantial center in the vehicle width direction. Attached to the lamp opening 52a is a room lamp 55 for illuminating the interior of the cabin 13 (FIG. 1). The room lamp 55 is thus arranged beneath and at the vehicle width center of the roof panel 40.

The left and right longitudinal arches 54, 54 are mounted spaced apart from each other in the vehicle width direction to be located respectively between the room lamp 55 arranged at the vehicle width center and the left and right roof rails 15, 15. Further, the left and right longitudinal arches 54, 54 connect the front end lateral arch 51, the middle lateral arch 52, and the rear end lateral arch 53 together.

Each of the left and right longitudinal arches 54, 54 can be composed of two portions divided in the longitudinal direction of the vehicle body. For example, the left longitudinal arch 54 is composed of two longitudinal-arch divided bodies 56, 57 aligned in the longitudinal direction of the vehicle body. Similarly, the right longitudinal arch 54 is composed of two longitudinal-arch divided bodies 58, 59 aligned in the longitudinal direction of the vehicle body.

As shown in FIG. 7, each of the lateral arches 51 to 53, and the left and right longitudinal arches 54, 54 is formed in a hat-shaped cross section opened upward. More specifically, each of the lateral arches 51 to 53, and the longitudinal-arch divided bodies 56 to 59 is formed by press molding a steel sheet, and has a long narrow arch body 61 formed in a substantially U-shaped cross section, and opposite flanges 62, 63 formed to extend substantially horizontally outward from upper edges of the arch body 61 opened upward.

Each of the front-side longitudinal-arch divided bodies 56, 58 is mounted between the rear-side flange 63 of the front end lateral arch 51 and the front-side flange 62 of the middle lateral arch 52 and joined thereto by spot welding at two points on each joint portion. Each of the rear-side longitudinal-arch divided bodies 57, 59 is mounted between the rear-side flange 63 of the middle lateral arch 52 and the front-side flange 62 of the rear lateral arch 53 and joined thereto by spot welding at two points on each joint portion. Reference numeral 64 denotes the points of junction or weld points at which the longitudinal-arch divided bodies 56 to 59 are spot welded.

As shown in FIGS. 6 and 7, the roof panel 40 is joined to the roof supporting skeleton body 50. The front end 41 of the roof panel 40 is joined to the front end lateral arch 51. The rear end 42 of the roof panel 40 is joined to the rear end lateral arch 53. The longitudinal middle section in the roof panel 40 is joined to the opposite flanges 62, 63 of the longitudinal-arch divided bodies 56 to 59 by spot welding.

More specifically, the front end 41 of the roof panel 40 is joined to the front-side flange 62 of the front end lateral arch 51 by spot welding at a plurality of, for example, twelve points aligned in the vehicle width direction at specified intervals. The rear end 42 of the roof panel 40 is joined to the rear-side flange 63 of the rear end lateral arch 53 by spot welding at a plurality of, for example, twelve points aligned in the vehicle width direction at specified intervals. Reference numeral 65 denotes the points of junction or weld points at which the front end 41 and the rear end 42 of the roof panel 40 are spot welded.

The roof panel assembly 16 is joined to the left and right roof rails 15, 15, via four corners 43 to 46 of the rectangular roof panel 40, the left and right ends 47, 47 of the rectangular roof panel 40, opposite ends of the front end lateral arch 51, and opposite ends of the rear end lateral arch 53. Opposite ends of the middle lateral arch 52 may optionally be joined to the left and right roof rails 15, 15, which is preferable to further increase the strength and rigidity of the roof 14.

More specifically, the left and right front-side corners 43, 44 of the roof panel 40 are respectively joined to the left and right roof rails 15, 15 by spot welding at a plurality of, for example, three points on each joint portion at specified intervals in the vehicle width direction. Reference numeral 66 denotes the points of junction or weld points at which the left and right front-side corners 43, 44 of the roof panel 40 are spot welded. Three weld points 66 on each of the left and right front-side corners 43, 44 are arranged on an extension line of the plurality of points 65 aligned on the front end 41 of the roof panel 40.

The left and right rear-side corners 45, 46 of the roof panel 40 are respectively joined to the left and right roof rails 15, 15 by spot welding at a plurality of, for example, four points on each joint portion at specified intervals in the vehicle width direction. Reference numeral 67 denotes the points of junction or weld points at which the left and right rear-side corners 45, 46 of the roof panel 40 are spot welded. Four weld points 67 on each of the left and right rear-side corners 45, 46 are arranged on an extension line of the plurality of points 65 aligned on the rear end 42 of the roof panel 40.

Next will be described a joint structure of the right end 47 of the roof panel 40 to the right roof rail 15. A joint structure of the left end 47 of the roof panel 40 to the left roof rail 15 is the same as the right-side joint structure, and a description thereof will be omitted.

As shown in FIGS. 4 and 5, the right end 47 of the roof panel 40 is formed so as to extend downwardly toward the stepped surface 33a of the right stepped section 33 and overlapped thereon, whereby a right groove 71 opened upward is formed by the right stepped section 33 and the right end 47. As shown in FIG. 5, the right end 47 is joined to the right stepped surface 33a via an adhesion section 72 using adhesive agent and a plurality of temporarily securing sections 73 which provide temporary affixation by welding until the adhesion section 72 can exhibit an adhesion force. Namely, the right end 47 is joined to the right stepped surface 33a mainly via the adhesion section 72 and subsidiarily via the temporarily securing sections 73.

As shown in FIGS. 1 and 6, as the plurality of temporarily securing sections 73, for example, four right temporarily securing sections 73 are aligned in the longitudinal direction of the vehicle body. As shown in FIGS. 4, 5, and 6, the temporarily securing sections 73 are located between an edge 47a of the right end 47 of the roof panel 40 and the adhesion section 72 to be aligned along the edge 47a. Namely, the adhesion section 72 is located, at the right end 47 of the roof panel 40, inward of the temporarily securing sections 73 in the vehicle width direction. Therefore, the adhesion section 72 for the right end 47 of the roof panel 40 can be formed continuously in the longitudinal direction of the groove 71 without overlapping with the temporarily securing sections 73. As a result, an adhesion area between the right end 47 of the roof panel 40 and the right stepped section 33 can be wide, and thus adhesion strength therebetween can be increased.

Conventionally, the left and right roof rails 15, 15 and the left and right ends 47, 47 of the roof panel 40 are vertically overlapped on each other, respectively, and joined together by spot welding at a plurality of points. In the present invention, however, they are joined via the adhesion sections 72 dispensing with the spot welding. The adhesion force of the adhesion sections 72 is therefore appropriately determined in a development stage of the vehicle with due consideration of a junction force by the spot welding which has been conventionally employed. When an aluminum-plated steel sheet is used as the outer panels 31, the adhesion force of the adhesion sections 72 is set to be equal to or greater than a plating adhesion force (peel strength of the plating) between an aluminum plating layer and a base steel sheet.

The type of the adhesive agent and the size (thickness, width, length) of the adhesion sections 72 are arbitrary as far as the adhesion sections 72 can exhibit a predetermined adhesion force sufficient to join the right end 47 with the right stepped surface 33a when the adhesive agent is cured. For example, the adhesion section 72 is formed continuously, or intermittently at specified intervals, in the longitudinal direction of the vehicle body with a predetermined width, as shown in FIGS. 3 and 5.

It is most preferable that the temporarily securing sections 73 are welded by pulse laser welding. Pulse laser welding is a well-known technique, in which a pulsed laser beam outputted intermittently from a pulse laser oscillator is used for welding. Since the irradiation time of the pulsed laser beam is short, the spot welding operation can be performed without significant thermal effect on peripheral portions. Therefore, welding traces (hit traces or dents) formed by welding on the end 47 of the roof panel 40 are small. Further, areas of weld portions (the temporarily securing sections 73) can be small, and the weld portions can be located close to the edge 47a of the end 47 of the roof panel 40.

Other than pulse laser welding, an alternative welding technique may be used for welding the temporarily securing sections 73 by which hit traces formed by welding can be very small, about 1 millimeter.

As described above, the temporarily securing sections 73 are weld portions which provide temporary affixation until the adhesion section 72 can exhibit the predetermined adhesion force, so that the welding strength thereof may be small. That is, the right end 47 of the roof panel 40 is joined to the stepped surface 33a mainly via the adhesion section 72. After the adhesion section 72 has exhibited the predetermined adhesion force, the temporarily securing sections 73 finish their role of providing temporary affixation, and are necessary only to compensate the bonding effect by the adhesion section 72. Therefore, the welding traces of the temporarily securing sections 73 formed on a bottom 71a of the right groove 71 can be small and inconspicuous.

The welding strength of the temporarily securing sections 73 is appropriately determined in the development stage of the vehicle. When an aluminum-plated steel sheet is used as the outer panels 31, the welding strength of the temporarily securing sections 73 is set to be equal to or greater than the plating adhesion force (peel strength of the plating) between the aluminum plating layer and the base steel sheet.

The temporarily securing sections 73 are covered with a filling agent layer 74 which is formed by a filling agent filled into the right stepped section 33, and thus not visible from the outside. The filling agent layer 74 has a width Ws that ranges from a right corner 39 formed between the upper edge 36 of the right outer panel 31 and the right stepped surface 33a to a region covering the temporarily securing sections 73. The filling agent layer 74 has a maximum height Hs which is a distance from the right corner 39 to the filling agent layer 74. By thus setting the width Ws and the maximum height Hs, the right corner 39 and the temporarily securing sections 73 are covered with the filling agent layer 74. As a result, it is possible to further enhance the external appearance of the vehicle 10.

The type of the filling agent is arbitrary, but, for example, a gap filler generally called "dust sealer" is suitable for use as the filling agent. The gap filler is a viscous liquid and changes to an elastic solid over time.

Further, a surface of the filling agent layer 74 filled into the right stepped section 33 has a substantially curved shape gradually curved downward from nearby the upper edge 36 of the right outer panel 31 to the region covering the temporarily securing sections 73. By covering the right corner 39 and peripheries thereof with the filling agent layer 74 having the substantially curved-shaped surface, a contour of the right groove 71 is made inconspicuous, and thus it is possible to further enhance the external appearance of the vehicle 10.

Next will be described a manufacturing process of the roof 14.

First, as shown in FIG. 7, the lateral arches 51 to 53 and the longitudinal-arch divided bodies 56 to 59 are combined and welded together, whereby the roof supporting skeleton body 50 is produced.

Next, as shown in FIG. 6, the roof panel 40 is superposed on the roof supporting skeleton body 50 and welded thereto, whereby the roof panel assembly 16 is produced.

Next, as shown in FIG. 1, the roof panel assembly 16 is mounted on the left and right roof rails 15, 15 of the vehicle body 11 and joined thereto.

More specifically, first, the adhesive agent is applied to the stepped surface 33a of the stepped section 33 of the roof rail 15 as shown in FIGS. 3 and 5, whereby the adhesion section 72 is formed on the stepped surface 33a.

Then, the roof panel assembly 16 is positioned and superposed on the left and right roof rails 15, 15 as shown in FIG. 6. As a result, the left and right ends 47, 47 of the roof panel 40 are overlapped on the adhesion section 72 as shown in FIGS. 4 and 5.

The left and right ends 47, 47 of the roof panel 40 are then temporarily secured to the stepped surfaces 33a, 33a by pulse laser welding at specified positions between the edges 47a, 47a of the left and right ends 47, 47 of the roof panel 40 and the adhesion sections 72, 72, as shown in FIGS. 5 and 6. The positions at which they are temporarily secured are the temporarily securing sections 73.

Then, the corners 43 to 46 of the roof panel 40, the opposite ends of the front end lateral arch 51, and the opposite ends of the rear end lateral arch 53 are welded to the inner rails 21, 21 of the left and right roof rails 15, 15, as shown in FIG. 6.

Next, as shown in FIG. 5, the filling agent is applied to the stepped section 33 and filled on the stepped surface 33a with the width Ws from the corner 39 to form the filling agent layer 74. As a result, the temporarily securing sections 73 are covered with the filling agent layer 74. To form the surface of the filling agent layer 74 in a smoothly curved shape, for example, a brush or a thin plate-shaped spatula is used for shaping of the surface.

Next, as shown in FIG. 1, the assembled vehicle body 11 with the roof panel assembly 16 being mounted thereon is dipped in an electrodeposition liquid which is contained in a treatment tank not shown (surface treatment process). At this time, buoyancy is applied to the left and right ends 47, 47 of the roof panel 40. The adhesion sections 72, 72 (FIG. 4) are yet little hardened, however, the left and right ends 47, 47 are temporarily secured to the left and right roof rails 15, 15 via the temporarily securing sections 73. Therefore, the left and right ends 47, 47 of the roof panel 40 can be prevented from being separated from the left and right roof rails 15, 15.

Next, after a coating process for applying a coating material to the vehicle body 11, a glazing process for glazing the coating material is performed. During the glazing process, the adhesion sections 72, 72 are heated and hardened to exhibit the predetermined adhesion force. As a result, the left and right ends 47, 47 of the roof panel 40 are firmly joined to the left and right roof rails 15, 15 via the adhesion sections 72, 72. The manufacturing process of the roof 14 has been completed.

A summary of the descriptions above will now be given. As shown in FIG. 5, the welding traces of the temporarily securing sections 73 formed on the bottoms 71a, 71a of the left and right grooves 71, 71 can be small and inconspicuous. Further, the temporarily securing sections 73 are covered with the filling agent layers 74, 74 which are formed by the filling agent filled into the left and right stepped sections 33, 33 and thus not visible from the outside. The left and right ends 47, 47 of the roof panel 40 are formed so as to extend downwardly toward the stepped surfaces 33a, 33a of the left and right stepped sections 33, 33 and overlapped thereon, whereby the left and right grooves 71, 71 opened upward are formed by the left and right stepped sections 33, 33 and the left and right ends 47, 47. Since the left and right grooves 71, 71 are shallow, a satisfactory external appearance can be ensured. Therefore, there is no need to cover the left and right grooves 71, 71 by decorative moldings. Further, joint portions of the left and right outer-panel upper flanges 34, 34 and the upper surfaces 21a, 21a of the left and right inner rails 21, 21 are covered by the roof panel 40, and thus not visible from the outside. In this manner, it is possible to enhance the external appearance of the vehicle 10 without providing the decorative moldings on joint portions of the left and right roof rails 15, 15 and the left and right ends 47, 47 of the roof panel 40.

Further, as shown in FIGS. 1 and 6, the roof panel assembly 16 is built into the vehicle body 11 with the roof supporting skeleton body 50 being mounted on and between the left and right roof rails 15, 15 (more particularly, the left and right inner rails 21, 21). More specifically, the roof panel assembly 16 is joined to the left and right roof rails 15, 15 via the left and right ends 47, 47 of the roof panel 40 as well as the opposite ends of the front end lateral arch 51 and the opposite ends of the rear end lateral arch 53, whereby the roof panel assembly 16 is built into the vehicle body 11. In other words, the number of joint portions for joining the roof panel assembly 16 to the left and right roof rails 15, 15 can be small. As a result, the man-hours required for assembling the vehicle body 11 can be reduced and the assembly operation of the vehicle body 11 can be facilitated.

Further, the roof supporting skeleton body 50 is composed of the front end lateral arch 51, middle lateral arch 52, and rear end lateral arch 53 extending in the vehicle width direction, and the at least one longitudinal arch 54 extending in the longitudinal direction of the vehicle body. In the structure where the roof panel assembly 16 is mounted on and between the left and right roof rails 15, 15, a frame having a substantially rectangular shape in plan view is formed by the left and right roof rails 15, 15 and the front and rear end lateral arches 51, 53. By providing the middle lateral arch 52 and the at least one longitudinal arch 54 so as to divide the inside of the substantially rectangular frame into a plurality of spaces, strength and rigidity of the roof 14 can be increased.

More particularly, when the roof supporting skeleton body 50 includes two longitudinal arches 54, 54, the inside of the substantially rectangular frame is divided into six spaces, the strength and rigidity of the roof 14 can be further increased. As a result, the required thickness of the roof panel 40 can be reduced, and thus the weight of the vehicle body 11 can be reduced.

INDUSTRIAL APPLICABILITY

The vehicle roof structure of the present invention is well suited for use in passenger vehicles such as sedan cars, wagon cars, etc.

REFERENCE CHARACTERS

10 . . . vehicle, 11 . . . vehicle body, 14 . . . vehicle roof structure (roof), 15 . . . roof rail, 16 . . . roof panel assembly, 21 . . . inner rail, 21a . . . upper surface, 31 . . . outer panel, 33 . . . stepped section, 33a . . . stepped surface, 34 . . . upper flange, 39 . . . corner, 40 . . . roof panel, 41 . . . front end, 42 . . . rear end, 47 . . . left and right ends, 50 . . . roof supporting skeleton body, 51 . . . front end lateral arch, 52 . . . middle lateral arch, 53 . . . rear end lateral arch, 54 . . . longitudinal arch, 71 . . . groove, 72 . . . adhesion section, 73 . . . temporarily securing section, 74 . . . filling agent layer, Ws . . . width of the filling agent layer

The invention claimed is:

1. A vehicle roof structure comprising a roof panel, and left and right roof rails extending in a longitudinal direction of a vehicle body for supporting the roof panel,
    wherein the left and right roof rails include left and right inner rails having a closed cross section and extending in the longitudinal direction of the vehicle body to constitute part of a vehicle body frame, and left and right outer panels located outward of the left and right inner rails in a vehicle width direction,
    wherein the left and right outer panels include left and right stepped sections each extending from an upper edge of a corresponding one of the left and right outer panels downward and then inward in the vehicle width direction to form a step, and left and right upper flanges each extending from a corresponding one of the left and right stepped sections downward and then inward in the vehicle width direction to form a step,
    wherein the left and right upper flanges of the left and right outer panels are overlapped, respectively, on upper surfaces of the left and right inner rails and joined thereto,
    wherein the roof panel has left and right ends formed so as to extend downwardly toward stepped surfaces of the left and right stepped sections and overlapped on the left and right stepped surfaces, whereby left and right grooves opened upward are formed by the left and right stepped sections and the left and right ends,
    wherein the left and right ends of the roof panel are joined to the left and right stepped surfaces via adhesion sections using adhesive agent and temporarily securing sections that provide temporary affixation by welding until the adhesion sections can exhibit an adhesion force,
    wherein the temporarily securing sections are covered with filling agent layers that are formed by a filling agent filled into the left and right stepped sections,
    wherein the adhesion sections are located, at the left and right ends of the roof panel, inward of the temporarily securing sections in the vehicle width direction,
    wherein widths of the filling agent layers range in the left and right stepped sections, respectively, from left and right corners formed between the upper edges of the left and right outer panels and the left and right stepped surfaces to regions covering the temporarily securing sections, and
    wherein surfaces of the filling agent layers filled into the left and right stepped sections have a substantially curved shape gradually curved downward from nearby the upper edges of the left and right outer panels to the regions covering the temporarily securing sections.

2. The vehicle roof structure of claim 1, further comprising a roof supporting skeleton body mounted on and between the left and right roof rails to support the roof panel, the roof supporting skeleton body and the roof panel together forming a roof panel assembly,
    wherein the roof supporting skeleton body includes:
    a front end lateral arch extending in the vehicle width direction along a front end of the roof panel;
    a middle lateral arch extending in the vehicle width direction along a longitudinal middle section of the roof panel;
    a rear end lateral arch extending in the vehicle width direction along a rear end of the roof panel; and
    at least one longitudinal arch positioned at a substantial center in the vehicle width direction of the roof panel and extending in the longitudinal direction of the vehicle body to connect the front end lateral arch, the middle lateral arch, and the rear end lateral arch together,
    wherein the front end of the roof panel is joined to the front end lateral arch, and the rear end of the roof panel is joined to the rear end lateral arch, and
    wherein the roof panel assembly is joined to the left and right roof rails via the left and right ends of the roof panel as well as opposite ends of the front end lateral arch and opposite ends of the rear end lateral arch.

3. The vehicle roof structure of claim 1, further comprising a roof supporting skeleton body mounted on and between the left and right roof rails to support the roof panel, the roof supporting skeleton body and the roof panel together forming a roof panel assembly,
    wherein the roof supporting skeleton body includes:
    a front end lateral arch extending in the vehicle width direction along a front end of the roof panel;
    a middle lateral arch extending in the vehicle width direction along a longitudinal middle section of the roof panel;
    a rear end lateral arch extending in the vehicle width direction along a rear end of the roof panel; and
    left and right longitudinal arches positioned at a substantial center in the vehicle width direction of the roof panel and extending in the longitudinal direction of the vehicle body to connect the front end lateral arch, the middle lateral arch, and the rear end lateral arch together,
    wherein the left and right longitudinal arches are spaced apart from each other in the vehicle width direction,
    wherein the front end of the roof panel is joined to the front end lateral arch, and the rear end of the roof panel is joined to the rear end lateral arch, and
    wherein the roof panel assembly is joined to the left and right roof rails via the left and right ends of the roof panel as well as opposite ends of the front end lateral arch and opposite ends of the rear end lateral arch.

* * * * *